US011747485B2

(12) United States Patent
Antonov et al.

(10) Patent No.: US 11,747,485 B2
(45) Date of Patent: Sep. 5, 2023

(54) MULTICHANNEL MULTISYSTEM RADIO-FREQUENCY UNIT OF NAVIGATIONAL SATELLITE RECEIVER

(71) Applicants: Nikolai Tcherniakovski, Minsk (BY); OBSHCHESTVO S OGRANICHENNOY OTVETSTVENNOSTYU "NTLAB-SC", Moscow (RU)

(72) Inventors: Igor Antonov, Minsk (BY); Andrei Kolotkin, Minsk (BY)

(73) Assignees: NIKOLAI TCHERNIAKOVSKI, Minsk (BY); OBSHCHESTVO S OGRANICHENNOY OTVETSTVENNOSTYU "NTLAB-SC", Moscow (RU)

( * ) Notice: Subject to any disclaimer, the term of this patent is extended or adjusted under 35 U.S.C. 154(b) by 326 days.

(21) Appl. No.: 17/416,776

(22) PCT Filed: Dec. 21, 2018

(86) PCT No.: PCT/IB2018/060535
§ 371 (c)(1),
(2) Date: Jun. 21, 2021

(87) PCT Pub. No.: WO2020/128601
PCT Pub. Date: Jun. 25, 2020

(65) Prior Publication Data
US 2022/0043161 A1    Feb. 10, 2022

(51) Int. Cl.
*G01S 19/33*    (2010.01)
*G01S 19/35*    (2010.01)
*H04W 84/06*    (2009.01)

(52) U.S. Cl.
CPC ............. *G01S 19/33* (2013.01); *G01S 19/35* (2013.01); *H04W 84/06* (2013.01)

(58) Field of Classification Search
CPC ......... G01S 19/33; G01S 19/35; H04W 84/06
See application file for complete search history.

(56) References Cited

FOREIGN PATENT DOCUMENTS

| RU | 116298 U1 | 5/2012 |
|---|---|---|
| WO | WO2017/137878 | 8/2017 |

OTHER PUBLICATIONS

Eric Schafer et al., A four-channel GNSS front-end IC for a compact interference- and jamming-robust multi-antenna Galileo/GPS receiver. IEEE, Dec. 3-5, 2014 https://ieeexplore.ieee.org/abstract/document/7045150.

*Primary Examiner* — Dao L Phan
(74) *Attorney, Agent, or Firm* — Mark David Torche; Patwrite Law

(57) ABSTRACT

Invention relates to multisystem radio-frequency units of navigational satellite receiver and may be used for simultaneous reception of navigation signals from multiple navigation systems: GLONAS, GPS, Galileo, BeiDou, IRNSS and QZSS. The unit comprises 4 reception channels, 3 of which are identical and independently configurable reception channels, simultaneously receiving of navigation signals from GLONAS, GPS, Galileo, BeiDou, IRNSS and QZSS navigation systems in various combinations, and one channel for signal reception of S band of IRNSS, L2/L3/L5 bands and 65-862 MHz bands, including real-time differential corrections data (RTK). The unit also comprises 4 frequency synthesizers, a quadrature heterodyne signal driver for mixers for each channel and automatic calibration system for intermediate frequency filter passband for each channel. 3 identical channels for L1, E1, B1, E6, B3, L2, L3, B2, L5, E5 bands of signal reception have configurable channel outputs types with ability to choose real or complex outputs.

6 Claims, 1 Drawing Sheet

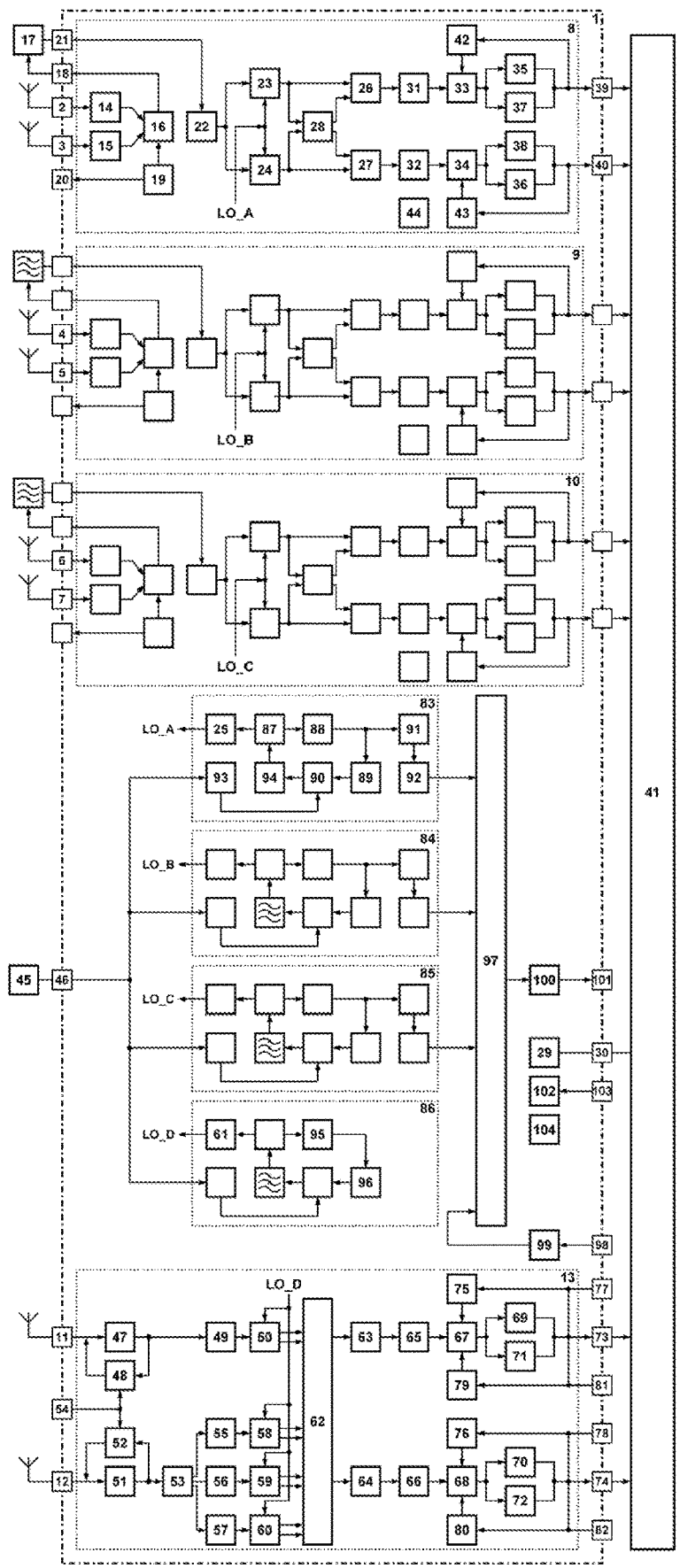

MULTICHANNEL MULTISYSTEM RADIO-FREQUENCY UNIT OF NAVIGATIONAL SATELLITE RECEIVER

The invention relates to the multisystem radio-frequency units of a navigational satellite receiver (NSR) and may be used for simultaneous reception of navigation signals from multiple navigation systems: Global Navigation Satellite System of Russia (GLONAS), US Global Positioning System (GPS), Global Navigation Satellite System of the European Union and European Space Agency (Galileo), China's Navigation Satellite System (BeiDou/COMPASS), India's Regional Navigation Satellite System (IRNSS) and Japan's Regional Navigation Satellite System (QZSS).

It is known that a navigator positioning error is reduced by using of multiple systems simultaneously. In addition, "hybrid" navigators "see" simultaneously more satellites than the devices capable of operating only with one of the system that provides a higher reception reliability [1], [2].

A multisystem signal receiver (CN202533579U) comprising a radio-frequency unit, a radio-frequency channel convertor, a heterodyne reference signal source, a signal processing module capable of simultaneously receiving a signal from four different navigational satellite systems in a wide frequency spectrum—GPS, GLONASS, BeiDou-1 and Bei-Dou-2 [3] is also known from the prior art.

The disadvantage of the above signal receivers is that they are provided with a single common signal input and also that a fixed channel is provided for each of the used navigational satellite systems, thereby limiting the quantity of possible combinations of the to-be processed signals from the navigational satellite systems.

A multichannel multisystem radio-frequency unit of the navigational satellite receiver is known [4]. The unit comprises four identical independently configurable reception channels with a high degree of isolation from interpenetration of a signal and contaminating signals, two heterodyne frequency synthesizers having a single heterodyne signal generation mode for all four channels, a quadrature heterodyne signal driver for quadrature mixers and an automatic calibration system for intermediate frequency filter passband [4].

The disadvantages of this signal receiver are the following:

a) the four reception channels are not able to receive all Global Navigation Satellite System signals, including signal reception of IRNSS S band;
b) the four reception channels have only real outputs which limit digital processing of output signals;
c) the four reception channels have the inputs to connect only passive antenna modules since additional separatory capacitor, active antenna power supply and passive/active antenna switch are needed to connect an active antenna;
d) the heterodyne frequency synthesizer has integer division ratio that is not to allow using of any conversion frequency from a required range including to form a clock for correlator and embedded analog-to-digital converters (ADC) and to limit frequency range selection.

The claimed multichannel multisystem radio-frequency unit is configured to optimize the operation of the users' receiving devices when they are located at any point of the Earth space, increase accuracy of determining the location of receiving devices while maintaining the compactness of these devices and to reduce energy consumption of receiving devices.

1. The claimed multichannel multisystem radio-frequency unit of the navigational satellite receiver based on the "system-on-chip" technology and designed by using the receive path structure with one input signal frequency conversion for the simultaneous operation with any combination of signals of the Global navigation satellite systems (GNSS), including the Global Navigation Satellite System of Russia (GLONAS), US Global Positioning System (GPS), Global Navigation Satellite System of the European Union and European Space Agency (Galileo), China's Navigation Satellite System (BeiDou/COMPASS), India's Regional Navigation Satellite System (IRNSS) and Japan's Regional Navigation Satellite System (QZSS), characterized in that comprises:

three identical channels for L1, E1, B1, E6, B3, L2, L3, B2, L5, E5 bands of signal reception, each channel of which comprises:
  two low-noise amplifiers (LNA) connected to two co-located GLONAS/GPS/Galileo/BeiDou/COMPASS/QZSS antenna modules,
  active antenna detection and power supply circuit with short-protection circuit,
  GLONAS/GPS/Galileo/BeiDou/COMPASS/QZSS pass-band filter between two LNAs and the high-frequency amplifier,
  two identical intermediate-frequency (IF) stages, both of each contains a quadrature mixer serially connected with an analog switch and phase shifter common to both IF sections, an IF filter with cut-off autocalibration system, the output of which is connected to the input of the intermediate frequency gain control amplifier (IFA), forming a signal for inputs of the output line buffer and two-bit analog-to-digital converter (ADC) with thresholding, the outputs of which are connected to an analog/digital output signal detector with a digital-to-analog converter (DAC) to control gain of the IFA;

and the forth channel for signal reception of S band of IRNSS, L2/L3/L5 bands and 65-862 MHz bands, including real-time differential corrections data (RTK), comprising:
  LNA, connected to S/L2/L3/L5 bands antenna module,
  pass-band filter, forming signal for SL2/L3/L5 bands quadrature mixer,
  65-110 MHz/160-240 MHz/470-862 MHz gain control LNA, connected to 65-862 MHz antenna module,
  three 65-862 MHz pass-band filters, outputs of which are connected to three quadrature mixer accordingly,
  analog switch that selects output signals from one of the four quadrature mixers for transmission to quadrature IF stage, comprising
  a buffer amplifier,
  IF filter with bandwidth autocalibration system, output of which is connected to gain control IFA input, forming a signal for inputs of the output line buffer and two-bit analog-to-digital converter (ADC) with thresholding, the outputs of which are connected to an analog/digital output signal detector with a digital-to-analog converter to control gain of the IFA;

and four frequency synthesizers with phase-locked loop frequency control, each of which comprises
  a voltage controlled oscillator (VCO) coupled to a
  prescaler, the signal from which is supplied to the input of the first from two serially connected dividers to form the clock frequency for correlators in case of each of the three channels for L1, E1, B1, E6, B3, L2, L3, B2, L5, E5 bands signal reception and to a divider with a fractional division factor, integrated into the phase-locked loop and connected to
the input of a frequency-phase detector, the second input of which is connected to
a reference frequency divider forming a comparison frequency, while the output is connected to
a frequency synthesizer filter with autotuning system,
a heterodyne quadrature signal driver for quadrature mixers;
and also comprising a junction temperature sensor,
a power supply modules,
a serial interface to control modes of operation of components and configuration of the entire multichannel multisystem radio frequency unit.

Each of three identical channels for L1, E1, B1, E6, B3, L2, L3, B2, L5, E5 bands of signal reception has configurable channel outputs types with ability to choose real or complex outputs, commutating IQ quadrature mixers pass-through analog switches to IF filters thereby omitting a phase shifter in the signal path.

The multichannel multisystem radio-frequency unit of the navigational satellite receiver comprises a switch to select clock frequency for a correlator and embedded ADC clocking either from heterodyne frequency formed by any of three identical embedded frequency synthesizers for channels of L1, E1, B1, E6, B3, L2, L3, B2, L5, E5 bands of signal reception, or from a reference frequency of reference oscillator, or from any frequency, flowing through an external output.

The four heterodyne frequency synthesizers have an auto calculation system of synthesizer division ratio for frequency specified by user.

The multichannel multisystem radio-frequency unit of the navigational satellite receiver comprises four heterodyne frequency synthesizers with auto calculation system of synthesizer division ratio for frequency specified by user.

Forth channel for signal reception of S band of IRNSS, L2/L3/L5 bands and 65-862 MHz bands, including real-time differential corrections data (RTK), comprises combined auto gain control system of radio-frequency and IF stages with ability to set gain coefficients not automatically (manually).

The multichannel multisystem radio-frequency unit of the navigational satellite receiver comprise IF filter with the tunable signal bandwidth in the each channel.

The FIGURE illustrates a block diagram of the disclosed herein multisystem radio-frequency unit of the navigational satellite receiver based on "system-on-chip" technology.

As shown in the FIGURE, the radio-frequency unit 1 has the inputs 2, 3, 4, 5, 6 and 7 to connect the six GPS/GLONASS/Galileo/BeiDou/IRNSS/QZSS antenna modules, two for each reception channel 8, 9 and 10 respectively, and the input 11 to connect an antenna modules for signal reception of IRNSS S band, L2, L3 and L5 bands, and the input 12 to connect an antenna modules for signal reception of 65-862 MHz bands, including real-time differential corrections data (RTK), in the reception channel 13.

The first antenna module of the reception channel 8 is connected via the input 2 to the input of the low-noise amplifier (LNA) 14 and the second antenna module is connected via the input 3 to the input of LNA 15, the outputs of which are connected to the switch 16 that feed a signal to pass-band filter 17 via 18.

The active antenna detection and power supply circuit 19 has two operation modes:
the circuit 19 is connected via input 20 to co-located GLONAS/GPS/Galileo/BeiDou/COMPASS/QZSS second antenna module and forms supply voltage for this module, detects the second antenna module connection, limits a current of the second antenna module power supply circuit in case of short-circuit, automatically switches to the signal reception via switch 16 from the second antenna module and disables embedded LNA 14 to save current consumption of radio-frequency unit in case there is no short-circuit. If the second antenna module is disabled or short-circuit is detected in the second antenna module power supply circuit, the circuit 19 enables embedded LNA 14 and automatically switches a signal reception from co-located first antenna module via input 2;
the circuit 19 is intended for supplying other external devices (not shown) with ability to detect the device connection.

Pass-band filter 17 output is connected via input 21 to the high-frequency (HF) amplifier 22. Output signal from HF amplifier 22 and quadrature heterodyne signals from the quadrature heterodyne signal driver 14 are fed into epy quadrature mixers 23 and 24 with the stop band selection. The outputs of quadrature mixers 23 and 24 are connected to the inputs of analog switches 26 and 27 and the input of phase-shifter 28, forming a signal for the second inputs of analog switches 26 and 27, used to select an IF stage operation.

The outputs types of reception channel 8 are configured by serial peripheral interface 29 via inputs 30:
complex output signals, commutating quadrature mixers I 23 and Q 24 pass-through analog switches 26 and 27 to IF filters 31 and 32 thereby omitting a phase shifter in the signal path;
real output signals, when signals from the outputs of quadrature mixers 23 and 24 are fed to wideband phase-shifter 28, shifted phase of output signals of quadrature mixers 23 and 24 in wide frequency range and summed them up. In this case, a desired signal is summed up in phase and image signal is resulted in opposite phase side. Phase-shifter 28 is connected to the outputs of quadrature mixers 23 and 24 and thus one of the phase-shifter 28 outputs, connected to the analog switch 26 (I channel), receive a signal with a upper sideband of heterodyne frequency, and the other phase-shifter 28 output, connected to the analog switch 27 (Q channel) has a lower sideband of heterodyne frequency. Therefore, the interference in the signal spectrum lower (upper) sideband of the heterodyne frequency will be suppressed at the phase-shifter outputs. In this case, the narrowband interference allow to block signal reception by all systems of the multisystem NSR simultaneously made using the radio-frequency unit subject to the claimed herein which improves positioning validity under complicated reception conditions, i.e. improves interference immunity of NSR.

The reception channel 8 comprises two identical IF stages, which include intermediate frequency filters 31 and 32 with the tunable passband. The inputs of the filters 31 and 32 are connected to the outputs of analog switches 26 and 27, and the outputs of the filters 31 and 32 are connected to the input of the IFA 33 and 34 with auto gain control system (AGC). The outputs of the IFA 33 and 34 are connected to inputs of the differential analog buffers 35 and 36 and the ADC 37 and 38, the outputs of which are connected to the outputs 39 and 40 through which analog or digital signals from navigational systems are fed to an external correlator 41. The output analog and digital signals of the IF stage are detected by the detectors 42 and 43 with ability to set a detection level from two embedded DAC (not shown). The codes for DACs are set via a serial interface unit 29. The output control signals of the detectors 42 and 43 are transferred to the gain control inputs of the IFA 33 and 34 forming the IFA AGC system. IF AGC can operate in the following multiple modes:

with line differential outputs from the analog buffers 35 and 36, with AGC operating at output line signals;

with digital outputs from the embedded two-bit ADC 37 and 38, the threshold of which are set via the serial interface 29, while the signals from the outputs of the IFA 33 and 34 are transferred to the detectors 42 and 43 of the AGC systems;

with digital outputs from the integrated two-bit ADCs 37 and 38, the output signals of which are transferred to the detectors 42 and 43 of the AGC systems, while the detection threshold is set by the two integrated DACs (not shown) via the serial interface 29 thus integral percentage of overshoot on digital magnitude signals equals a direct or additional code that is set to the integrated DACs.

The "1" logic level for digital outputs and the output voltage range for line differential outputs are programmed via the serial interface 29.

The IF filter passband is automatically tuned by the auto calibration system 44, which uses the reference frequency from the reference frequency oscillator 45 via 46 input when the radio-frequency unit is powered on. Optionally, the IF filter passband may be changed and the start of the auto calibration system 44 may be initiated by setting required codes via the serial interface 29. Each IF filter has an individually programmable passband. In this case, the auto-calibration system is initiated and the state machine applies correction codes to IF filter according to the preset passband.

Channels 9 and 10 are identical to channel 8.

The antenna module of the reception channel 13 is connected via the input 11 to the input of LNA 47 with auto gain control system (AGC) 48 for signal reception of IRNSS S band and L2/L3/L5 bands, output of which is connected to an embedded pass-band filter 49. Quadrature mixer 50 receives a signal from the pass-band filter 49. The second antenna module of the reception channel 13 is connected via the input 12 to the input of LNA 51 with auto gain control system (AGC) 52 for signal reception of 65-862 MHz bands, the output of which is connected to the switch 53.

AGC system in RF stage can operate in the following multiple modes:

automatic gain control;

manual gain control by setting required codes via the serial interface 29;

manual gain control by setting voltage level, corresponding a digital code for gain settings, via external output 54.

The switch 53 is connected to embedded pass-band filters 55, 56 and 57 intended for three sub-bands 65 . . . 110 MHz, 160 . . . 240 MHz and 470 . . . 862 MHz respectively. The output of pass-band filters 55, 56 and 57 are connected to the first inputs of quadrature mixers 58, 59 and 60, the second inputs of which are connected to the quadrature heterodyne signal driver 61. The output signals of quadrature mixers 50, 58, 59 and 60 are transferred through the analog switch 62 to common quadrature IF stage of the reception channel 13.

The quadrature IF stage comprises buffer amplifiers 63 and 64, IF filters 65 and 66, outputs of which are connected to IFA 67 and 68 with AGC. The outputs of the IFA 67 and 68 are connected both to inputs of the differential analog buffers 69 and 70 and to the inputs of ADC 71 and 72 respectively, the outputs of which are connected to the outputs 73 and 74 through which analog or digital signals from navigational systems are fed to an external correlator 41. The analog and digital output signals of the IF stage are detected by the detectors 75 and 76 with ability to set a detection level from two embedded DACs (not shown). The DAC codes are set either via a serial interface unit 29 or via the external inputs 77 and 78. The output control signal of the detectors 75 and 76 are transferred to the gain control inputs of the IFA 67 and 68 forming the IFA AGC system. IF stage AGC can operate in the following multiple modes:

with line differential outputs from the analog buffers 69 and 70, with AGC operating at output line signals;

with digital outputs from the embedded two-bit ADC 71 and 72, the threshold of which are set via the serial interface 29, while the signals from the outputs of the IFA 67 and 68 are transferred to the detectors 75 and 76 of the AGC systems;

with digital outputs from the integrated two-bit ADCs 71 and 72, the output signals of which are transferred to the detectors 75 and 76 of the AGC systems, while the detection threshold is set by the two integrated DACs (not shown) via the serial interface 29 thus integral percentage of overshoot on digital magnitude signals equals a direct or additional code that is set to the integrated DACs.

Direct current offset compensation circuits (DCOC) 79 and 80 are intended to decrease an output offset of IFA 67 and 68, one reason of which is input signal offset. DCOC circuits 79 and 80 are connected both to analog differential buffers 69, 70 and ADCs 71 and 72 accordingly. Offset compensation signals from 79 and 80 systems are transferred both to the IFA inputs and to external capacitors (not shown) via outputs 81 and 82 in order to set a time constant.

The radio-frequency unit comprises four frequency synthesizers 83, 84, 85 and 86. The frequency synthesizer 83 comprises VCO 87, the differential output of which is connected to the inputs of the quadrature heterodyne signal driver 25 and VCO frequency divider 88. The output of the VCO frequency divider 88 is connected to the input of a frequency divider 89 generating the VCO divided frequency, supplied to the PFD 90, and to the input of the divider 91 the output of which is connected to the input of the divider 92, generating a clock signal used for operation of the external correlator 41. A comparison frequency signal, generated by the divider of the reference frequency 93 supplied from the input of the reference frequency oscillator 45 via input 46, is transferred to the second input of the PFD 90. The output of the PFD 90 is connected to the input of the integrated filter 94 of the frequency synthesizer 83 with a phase-locked loop (PLL). The output of the filter 94 is connected to the control input of the VCO 87. Division ratios of dividers 88, 89 and 91 are programmed by a serial interface 29. The bandwidth of the frequency synthesizer 83 is tuned by adjustment of the filter 94, the parameters of which are set by the serial interface 29. The VCO 87 includes an auto sub-band tuning system initiated by power up of the multichannel multisystem radio-frequency unit of the navigational satellite receiver or by a required command via the serial interface 29. The frequency synthesizers 84, 85 and 86 are similar to the frequency synthesizer 83. However, the frequency synthesizer 83 is characterized in that the signal from VCO frequency divider 95 is transferred only to frequency divider input 96.

A multiplexer 97 is used to select the source for the correlator 41 clock frequency which is formed either by the heterodyne frequency generated by any of the frequency synthesizers 83, 84 or 85, or by the reference frequency generated by the external reference frequency oscillator 45 via input 46, or by an external signal frequency, transferred via the input 98 to the buffer 99 and the multiplexer 97. The multiplexer 97 output is connected to the correlator 41 through the amplifier 100 via input 101.

A receive path from quadrature mixers to IF outputs of each of fourth channels, can be reconfigured in different ways via the serial interface 29, interference immunity.

Voltage regulators 102 for functional units of each channels 8, 9, 10, 13 (HF stage, IF stage) and synthesizers 83, 84, 85 and 86 are intended to stabilize operation modes of the multichannel multisystem radio-frequency unit 1 during variations of supply voltage, fed by an external source via 103, and also to reduce a penetration of external noises in supply circuits and to enhance an electrical isolation between channels.

In addition, the device includes a junction temperature sensor 104, indication of which is read by the interface 29.

Prototypes of the multichannel multisystem radio-frequency unit of the navigational satellite receiver designed based on the "system-on-chip" technology are made using a design documentation of "NTLab-Design" LLC and assembled in a QFN-type 108-pin package with a pin pitch of 0.4 mm and the following package dimensions: length—12 mm, width—12 mm, height—0.85 mm.

1. http://www.nis-glonass.ru/about-glonass/gps/
2. http://cyberleninka.ru/article/n/metod-isklyucheniya-oshibok-opredeleniya-mestopolozheniya-pri-odnovremennom-ispolzovanii-navigatsionnyh-sistem
3. CN202533579U, G01S19/13. G01S19/33, 14 Nov. 2012
4. WO/2017/1377878, G01S19/13, 17 Aug. 2017 https://patentscope.wipo.int/search/en/detail.jsf?docId=WO2017137878

The invention claimed is:

1. A multichannel multisystem radio-frequency unit of a navigational satellite receiver based on "system-on-chip" technology and designed by using a receive path structure with one input signal frequency conversion for simultaneous operation with any combination of signals of a Global navigation satellite system (GLASS), including the Global Navigation Satellite System of Russia (GLONAS), US Global Positioning System (GPS), Global Navigation Satellite System of the European Union and European Space Agency (Galileo), China's Navigation Satellite System (BeiDou/COMPASS), India's Regional Navigation Satellite System (IRNSS) and Japan's Regional Navigation Satellite System (QZSS), characterized in that it comprises:

three identical channels for L1, E1, B1, E6, B3, L2, L3, B2, L5, E5 bands of signal reception, each channel of which comprises:
two low-noise amplifiers (LNA) connected to two co-located GLONAS/GPS/Galileo/BeiDou/COMPASS/QZSS antenna modules,
an active antenna detection and power supply circuit with short-protection circuit,
a GLONAS/GPS/Galileo/BeiDou/COMPASS/QZSS pass-band filter between two LNAs and a high-frequency amplifier,
two identical intermediate-frequency (IF) stages, both of which contain a quadrature mixer serially connected with an analog switch and phase shifter common to both IF sections, an IF filter with a cut-off autocalibration system, having an output which is connected to an input of an intermediate frequency gain control amplifier (IFA), forming a signal for inputs of an output line buffer and a two-bit analog-to-digital converter (ADC) with thresholding, the outputs of which are connected to an analog/digital output signal detector with a digital-to-analog converter (DAC) to control gain of the IFA;

and a fourth channel for signal reception of an S band of IRNSS, L2/L3/L5 bands and 65-862 MHz bands, including real-time differential corrections data (RTK), comprising:
a LNA connected to a S/L2/L3/L5 bands antenna module,
a pass-band filter, forming a signal for S/L2/L3/L5 bands quadrature mixer,
a 65-110 MHz/160-240 MHz/470-862 MHz gain control LNA, connected to a 65-862 MHz antenna module,
three 65-862 MHz pass-band filters, having outputs that are respectively outputs of which are connected to three quadrature mixers,
an analog switch that selects output signals from one of the four quadrature mixers for transmission to a quadrature IF stage, comprising:
a buffer amplifier,
an IF filter with a bandwidth autocalibration system, having an output that is connected to a gain control IFA input, forming a signal for inputs of the output line buffer and the two-bit analog-to-digital converter (ADC) with thresholding, the outputs of which are connected to an analog/digital output signal detector with a digital-to-analog converter to control gain of the IFA;

and four frequency synthesizers with phase-locked loop frequency control, each of which comprises:
a voltage controlled oscillator (VCO) coupled to a prescaler, the signal from which is supplied to the input of the first of two serially connected dividers to form the clock frequency for correlators in case of each of the three channels for L1, E1, B1, E6, B3, L2, L3, B2, L5, E5 bands signal reception and to
a divider with a fractional division factor, integrated into the phase-locked loop and connected to
the input of a frequency-phase detector, the second input of which is connected to
a reference frequency divider forming a comparison frequency, while the output is connected to
a frequency synthesizer filter with autotuning system,
a heterodyne quadrature signal driver for quadrature mixers;
and also comprising a junction temperature sensor,
a power supply module, and,
a serial interface to control modes of operation of components and configuration of the entire multichannel multisystem radio frequency unit.

2. The multichannel multisystem radio-frequency unit of the navigational satellite receiver of claim 1, wherein each of three identical channels for the L1, E1, B1, E6, B3, L2, L3, B2, L5, E5 bands of signal reception have configurable channel outputs types with ability to choose real or complex outputs, commutating IQ quadrature mixers pass-through analog switches to IF filters thereby omitting a phase shifter in the signal path.

3. The multichannel multisystem radio-frequency unit of the navigational satellite receiver of claim 1, wherein it comprises a switch to select a dock frequency for a correlator and embedded ADC docking either from heterodyne frequency formed by any of the three identical embedded frequency synthesizers for channels of L1, E1, B1, E6, B3, L2, L3, B2, L5, E5 bands of signal reception, or from a reference frequency of reference oscillator, or from any frequency, flowing through an external output.

4. The multichannel multisystem radio-frequency unit of the navigational satellite receiver of claim 1 wherein it comprises four heterodyne frequency synthesizers with an auto calculation system of synthesizer division ratio for frequency specified by a user.

5. The multichannel multisystem radio-frequency unit of the navigational satellite receiver of claim 1 wherein the fourth channel for signal reception of S band of IRNSS, L2/L3/L5 bands and 65-862 MHz bands, including real-time differential corrections data (RTK), comprises a combined auto gain control system of radio-frequency and IF stages with ability to manually set gain coefficients.

6. The multichannel multisystem radio-frequency unit of the navigational satellite receiver of claim 1, wherein it comprises an IF filter with a tunable signal bandwidth in each channel.

\* \* \* \* \*